(12) United States Patent
Chen

(10) Patent No.: US 12,052,091 B2
(45) Date of Patent: Jul. 30, 2024

(54) POLARIZATION DIVERSIFIED WAVELENGTH DOMAIN DEMULTIPLEXER WITH A SINGLE SET OF OUTPUTS

(71) Applicant: Acacia Communications, Inc., Maynard, MA (US)

(72) Inventor: Long Chen, Marlboro, NJ (US)

( * ) Notice: Subject to any disclaimer, the term of this patent is extended or adjusted under 35 U.S.C. 154(b) by 0 days.

(21) Appl. No.: 17/407,556

(22) Filed: Aug. 20, 2021

(65) Prior Publication Data

US 2023/0056068 A1 Feb. 23, 2023

(51) Int. Cl.
*H04J 14/06* (2006.01)
*G02B 6/293* (2006.01)
*H04J 14/02* (2006.01)

(52) U.S. Cl.
CPC ............ *H04J 14/06* (2013.01); *G02B 6/2938* (2013.01); *H04J 14/0204* (2013.01); *H04J 14/0215* (2013.01)

(58) Field of Classification Search
None
See application file for complete search history.

(56) References Cited

U.S. PATENT DOCUMENTS

| | | | | |
|---|---|---|---|---|
| 6,434,292 | B1 * | 8/2002 | Kim | G02B 6/12011 385/24 |
| 2010/0254705 | A1 * | 10/2010 | Perkins | H04J 14/0204 398/48 |
| 2013/0177027 | A1 * | 7/2013 | Rasras | H04J 14/06 370/464 |
| 2015/0309252 | A1 * | 10/2015 | Kato | G02B 6/2773 385/11 |
| 2018/0198547 | A1 * | 7/2018 | Mehrvar | H04B 10/25 |

FOREIGN PATENT DOCUMENTS

WO 2011005596 A2 1/2011

OTHER PUBLICATIONS

PCT International Search Report and PCT Written Opinion for PCT International Application No. PCT/US2022/040972; date of mailing Nov. 23, 2022; (11 pages).

* cited by examiner

*Primary Examiner* — David W Lambert
(74) *Attorney, Agent, or Firm* — K&L GATES LLP

(57) ABSTRACT

In part, the disclosure relates to system. The system includes a polarization diversified wavelength demultiplexer (WDM). The polarization diversified wavelength demultiplexer includes a polarization beam splitter configured to output a first polarized signal and a second polarized signal based on an input signal; and a wavelength demultiplexer (WDM) having two inputs that are connected to the two outputs of the polarization beam splitter, and configured to output signals with a single set of outputs that carry signals of both polarizations, based on the first polarized signal from the first input and the second polarized signal from the second input.

13 Claims, 7 Drawing Sheets

POLARIZATION DIVERSIFIED WAVELENGTH DOMAIN DEMULTIPLEXER WITH A SINGLE SET OF OUTPUTS

FIELD

This disclosure relates generally to the field of photonic circuits such as photonic integrated circuits (PICs).

BACKGROUND

Contemporary optical communications and other photonic systems make extensive use of photonic integrated circuits (PICs) that are advantageously mass-produced in various configurations for various purposes.

SUMMARY

In part, in one aspect, the disclosure relates to a system. The system includes a polarization diversified wavelength demultiplexer (WDM). The polarization diversified wavelength demultiplexer includes a polarization beam splitter configured to output a first polarized signal and a second polarized signal based on an input signal; and a wavelength demultiplexer (WDM) having two inputs that are connected to the two outputs of the polarization beam splitter, and configured to output signals with a single set of outputs that carry signals of both polarizations, based on the first polarized signal from the first input and the second polarized signal from the second input.

In many embodiments, the polarization diversified wavelength demultiplexer is part of a photonic integrated circuit. In some embodiments, the WDM is an arrayed waveguide grating. In some embodiments, the WDM is an echelle grating. In various embodiments, the outputs of the WDM are integrated waveguides. In some embodiments, the output waveguides are connected to one or more waveguide integrated photodetectors.

In part, in another aspect, the disclosure relates to a system. The system includes an optical receiver. The optical receiver includes a polarization diversified wavelength demultiplexer (WDM). The polarization diversified wavelength demultiplexer (WDM) includes a polarization beam splitter configured to output a first polarized signal and a second polarized signal based on an input signal; a wavelength demultiplexer (WDM) having two inputs that are connected to the two outputs of the polarization beam splitter, and configured to output signals with a single set of outputs that carry signals of both polarizations, based on the first polarized signal from the first input and the second polarized signal from the second input; and a digital signal processor (DSP) operable to process the output signals from the WDM.

In many embodiments, the polarization diversified wavelength demultiplexer is part of a photonic integrated circuit. In some embodiments, the WDM is an arrayed waveguide grating. In various embodiments, the WDM is an echelle grating. In some embodiments, the outputs of the WDM are integrated waveguides. In many embodiments, the outputs waveguides are connected to waveguide integrated photodetectors.

In yet another aspect, the disclosure relates to a method of demultiplexing signals. The method includes receiving an input signal; splitting polarizations, via a polarization beam splitter, of the input signal into a first polarization signal and a second polarization signal; and coupling the first polarization signal to a wavelength demultiplexer via a first input and the second polarization signal to the same wavelength demultiplexer via a second input; and separating the wavelengths and outputting the different signals to one set of outputs that carry signals of both polarizations.

In some embodiments, the wavelength demultiplexer is an arrayed waveguide grating. In various embodiments, the wavelength demultiplexer is an echelle grating. In some embodiments, the wavelength demultiplexers are integrated waveguides.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
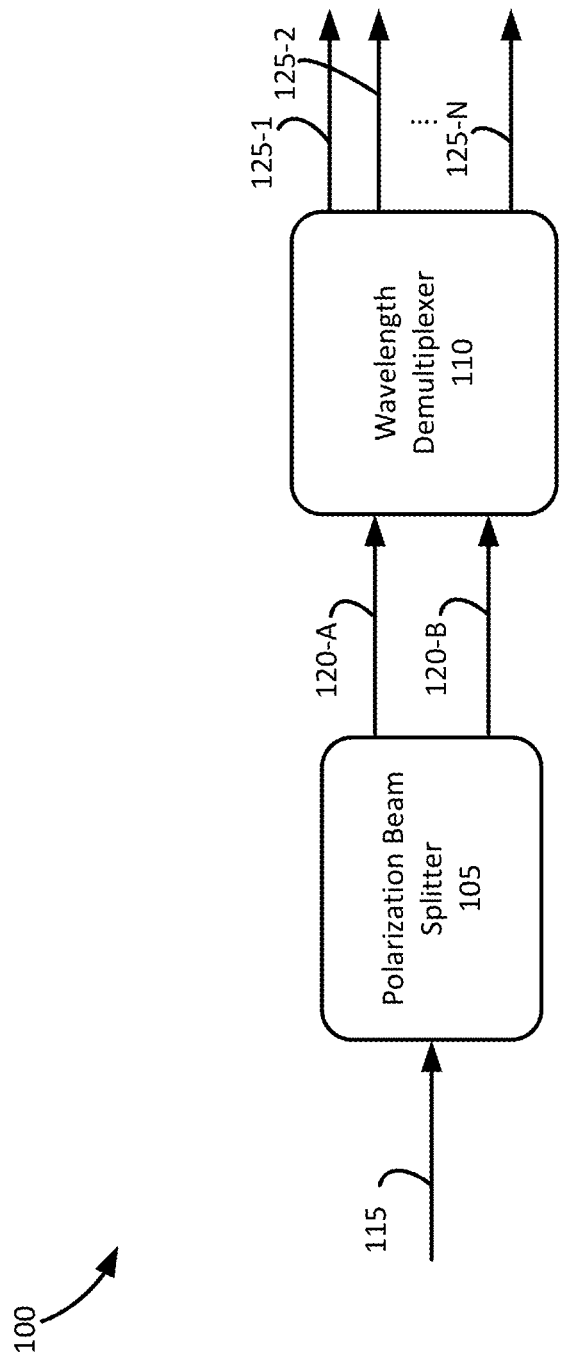
FIG. 1 illustrates a high level component diagram an example implementation of a polarization diversified wavelength demultiplexer, in accordance with one or more aspects of the disclosure.

In many embodiments, the current disclosure may enable the design, creation, and/or implementation of a demultiplexer for use with a receiver and/or a transceiver that provides improved performance and a reduced footprint. Typically, a demultiplexer is a device that takes a single input and routes it to one of several output lines. Generally, for wavelength domain demultiplexing, the different optical signals are separated by their wavelengths. In some embodiments, these different optical signals may have different and/or random polarizations. In certain embodiments, an optical component, particularly an optical component made of integrated photonic waveguides, may have different responses to signals of different polarizations. Often, implementations of demultiplexers built on photonic integrated circuits are categorized into polarization tolerant and polarization diversified demultiplexers. Generally, a polarization tolerant demultiplexer separates signals of different wavelengths without separating them into different polarizations first. Typically, responses of a wavelength separating element (also called a demultiplexer), characterized by a wavelength transmission spectrum from an input to a particular output, needs to have a sufficiently small polarization dependence. Generally, as an input signal polarization changes, a transmission spectrum has a sufficiently small shift both laterally in wavelength and vertically in transmission amplitude. Often, a polarization diversified demultiplexer first separates the signals into two paths with orthogonal polarizations, named as X polarization and Y polarization, for example.

In various embodiments, for photonic integrated circuits, two commonly used orthogonal polarizations are transverse electric (TE) polarization and a transverse magnetic (TM). In certain embodiments, orthogonally polarized signals (e.g., TE and TM) may be further separated to different outputs based on their wavelengths. In some embodiments, polarizations may be separated and maintained as orthogonal on photonic integrated circuits. In some embodiments, a polarization rotation may be included. For example, in certain embodiments, a Y polarization may be rotated by 90 degrees, and on photonic integrated circuits, signals may be separated as X polarization and X' polarization which may be rotated from the Y polarization and may have the same polarization as the X polarization. In some embodiments, components separating wavelengths for two polarization paths may be independent (i.e., two separate devices). In various embodiments, components separating wavelengths for two polarization paths may be two different designs, one for a X polarization and then other for a Y polarization. In certain embodiments, components separating wavelengths for two polarization paths may be two copies of a same design, one for a X polarization and the other for the rotated X' polarization.

In some embodiments, components separating wavelengths for two polarization paths may be one shared device, for example, by propagating light in the X polarization and X' polarization in opposite directions in the same device such as arrayed waveguide grating demultiplexer. However, in various embodiments, there may be two sets of outputs, one for each of the two polarizations. In certain embodiments, since an incoming signal may be of a random polarization (i.e., it can be completely aligned with the X polarization, or the Y or X' polarization, or a mixture of both polarizations) the two sets of outputs may often be combined together. In various embodiments, combining outputs may be done either optically into one set of waveguides or one set of photodetectors, or electrically with two sets of photodetectors where the signals may be combined in the electrical domain. Conventionally, implementing such a polarization diversified demultiplexers for high speed optical communications is difficult due to path matching and/or managing waveguide crossing associated with combining the two sets of outputs. Typically, an optical delay from input to photodetectors needs to be carefully matched between two orthogonal polarizations. Otherwise, often, as signals with mixed polarization come in, a relative time delay leads to degradation in the combined signal quality.

In various embodiments, the current disclosure may enable design, creation, and/or implementation of a polarization diversified wavelength demultiplexer (WDM) operable to retrieve original signals using a single demultiplexer (demux) and with a single set of outputs. In many embodiments, a polarization diversified WDM with a single set of outputs may reduce size and/or routing complexity of the outputs. In certain embodiments, a wavelength demux may be polarization sensitive, but may be designed in a way that when X and Y polarizations are placed at different input ports, a single set of output ports may provide a desired demux response for each polarization. In some embodiments, a polarization diversified WDM may include a polarization beam splitter and a modified wavelength demux. In most embodiments, a polarization diversified WDM may be enabled to receive a mixed and/or combined signal at an input to a polarization beam splitter and split the signal into a two signals with orthogonal polarizations (e.g., a signal having a transverse electric (TE) polarization and a signal having a transverse magnetic (TM) polarization). In certain embodiments, a modified wavelength demux within a polarization diversified WDM may be operable to demux signals with two orthogonal polarizations into a single set of outputs based on the wavelengths.

In many embodiments, a modified wavelength demux within a polarization diversified WDM may be an arrayed waveguide grating (AWG). In various embodiments, an AWG may include at least two input waveguides coupled to an input star coupler, a group of output waveguides placed at the output star coupler, and an arrayed waveguide between the two star couplers. In certain embodiments, two input waveguides may be designed so that one of them may be carrying signals of one polarization, and the other may be carrying signals of the orthogonal polarization.

In various embodiments, an AWG demultiplexer may work with a general principle: an input star coupler may be a passive optical device that may split optical signal from an input waveguide into the grating waveguides (in a cone-like pattern), with certain distribution in relative amplitude and relative phase that are dependent on the construction of the star coupler, signal polarization, as well as dimension and location of the input waveguide. In various embodiments, light may then propagates through grating waveguides, among which there may be a set of relative path length difference, and may accumulate another set of relative phase difference. In many embodiments, at an output of a star coupler, each grating waveguide may spread out light in a cone-like pattern and may illuminate a region of output waveguides. In certain embodiments, due to light from waveguide gratings having certain phase relation depending on wavelengths, different wavelengths may be focused onto different spots in the output region. In some embodiments, if a star coupler and a waveguide gratings have polarization dependent phase (for example, the star coupler slab or waveguide grating have different refractive indices for TE and TM polarizations), then the focusing spots for TE polarization and TM polarization of the same wavelength may be different. Also, in some embodiments, if an input waveguide is placed at a different location, the relative delay and optical phase from the input waveguide to the waveguide grating may change. In various embodiments, a focusing spot for the same wavelength may be different. In various embodiments, the input location can be moved to adjust where the output focusing spot is for the same wavelength. With that freedom, one can design the input locations for TE light and TM light in such a way that the focusing spots for both are aligned to the same location or the same output waveguide.

In various embodiments, as in an AWG the focusing spots for the same wavelength may be different for the same input waveguide but different polarization, and may be different for the same polarization but different input waveguides, with proper design including the waveguide gratings, star couplers, and input and output waveguides, an AWG may be fabricated with two input waveguides, one carrying signals of one polarization and the other carrying signals of the other polarization, that produces focusing spots that may overlap for the same wavelength. In various embodiments, demultiplexed signals from two different polarizations may be directed to a same set of output waveguides.

Refer now to the example embodiment of FIG. 1, which shows an example implementation of a polarization diversified wavelength demultiplexer WDM 100, in accordance with one or more aspects of the disclosure. The polarization diversified WDM 100 is enabled to receive an input signal at input waveguide 115, which is coupled to polarization beam splitter 105. The polarization beam splitter 105 is enabled to split each polarization of the input signal (e.g., a signal with X polarization and a signal with Y polarization) into waveguide 120-A and waveguide 120-B. Both 120-A and 120-B are coupled to the demultiplex 110, which splits the signal from 120-A and 120-B based on wavelength into a single set of output signals (e.g., signals 125-1, . . . N, 125 generally). The wavelength demultiplexer 110 can be implemented with different designs, including an arrayed waveguide grating, an echelle grating, etc.

Figure 2:
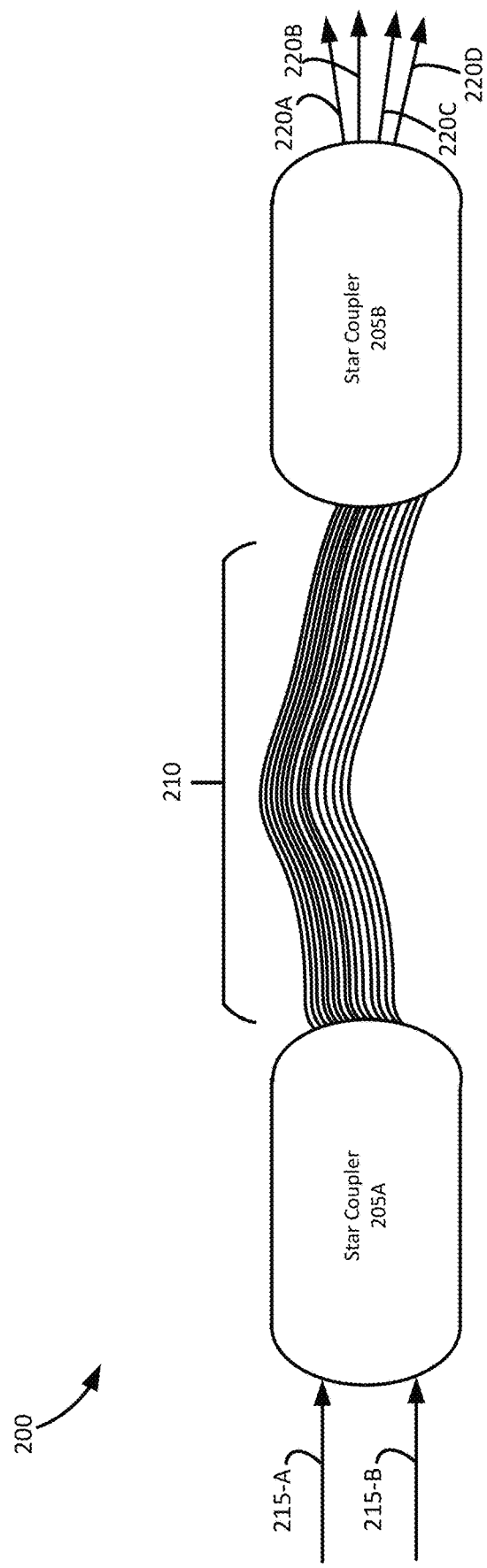
FIG. 2 illustrates a high level a component diagram of a modified waveguide demultiplexer that includes a first and second coupler, in accordance with one or more aspects of the disclosure.

Refer now to the example embodiment of FIG. 2, which illustrates a component diagram of a modified waveguide demultiplexer, in accordance with one or more aspects of the disclosure, as one embodiment of the demultiplexer 110 in FIG. 1. As shown in FIG. 2, a modified waveguide demultiplexer 200 includes a star coupler 205A coupled to a star coupler 205B via an arrayed waveguide grating (AWG) 210. Star coupler 205A is enabled to receive an input signal of one polarization X at input waveguide 215-A and an input signal of the orthogonal polarization Y at input waveguide signal 215-B. The star coupler 205A splits and/or spreads input signals received at waveguides 215-A and 215-B and outputs a plurality of split signals across the AWG 210. Depending on a shape of the AWG 210, the AWG 210 directs the plurality of signals output from star coupler 205A to specific output locations at star coupler 205B. Star coupler 205B is enabled to receive inputs from the AWG 210 and recombine the inputs into a single set of output signals (e.g., signals 220A, 220B, 220C, and 220D). In this embodiment, the modified demultiplexer outputs wavelength channel 1 from output waveguide 220A, wavelength channel 2 from output waveguide 220B, wavelength channel 3 from output waveguide 220C, and wavelength channel 4 from waveguide 220D. In various embodiments, a modified WDM may be constructed and/or configured to output more or less outputs. In other embodiments, a modified WDM may be constructed and/or configured to receive more or less input signals.

Figure 3:
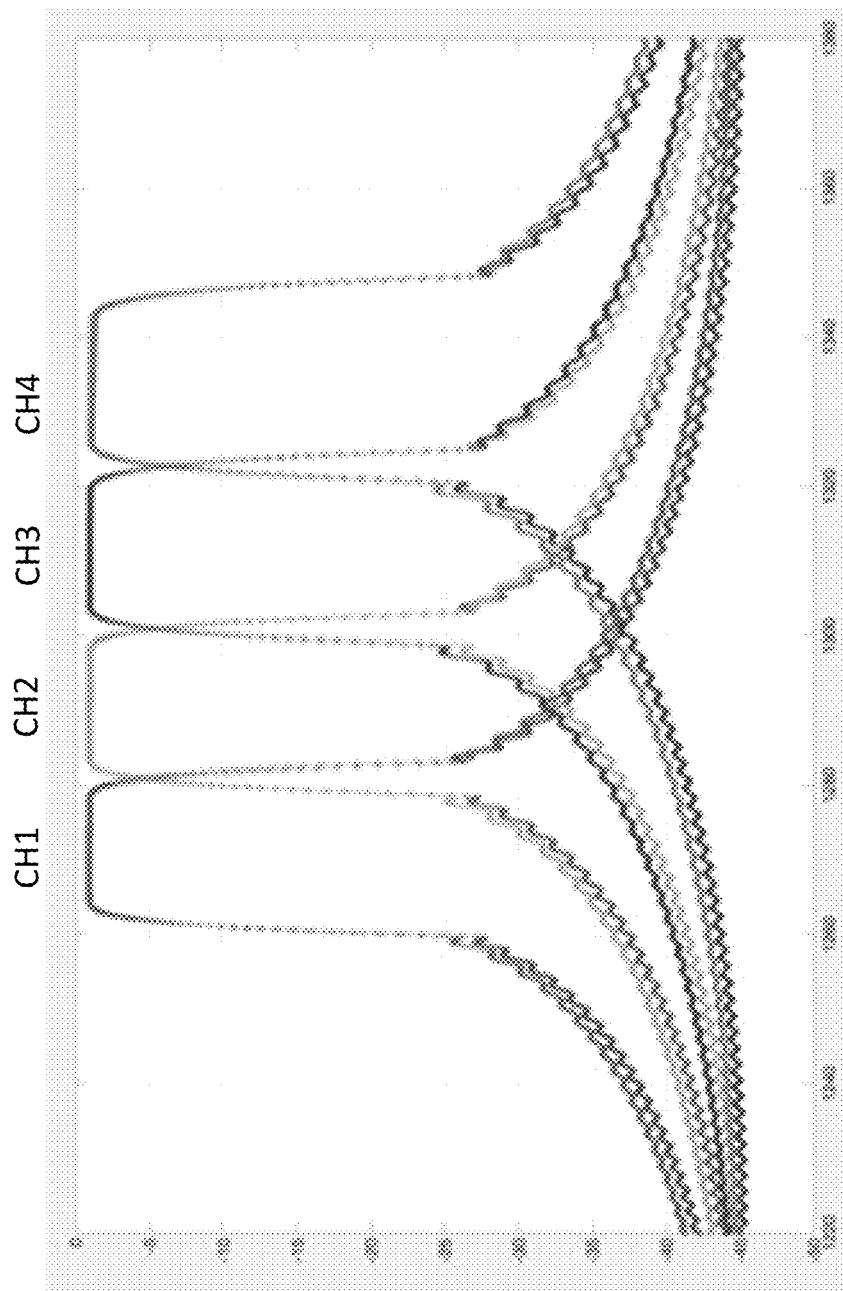
FIG. 3 illustrates a graph of outputs of a modified wavelength demultiplexer in accordance with one or more aspects of the disclosure.

Refer now to the example embodiment of FIG. 3, which illustrates a graph of outputs of a modified wavelength demultiplexer (WDM) shown in FIG. 2, in accordance with an embodiment of the disclosure. As shown in graph 300, the modified WDM is enabled to receive input signals from waveguides 215-A and 215-B and output channel 1, channel 2, channel 3, and channel 4 as shown in FIG. 3. For each output, there are two curves, one for input 215-A with polarization X, and the other for input 215-B with polarization Y. One can see that the two curves are substantially similar. Generally, in FIG. 3 the x-axis corresponds to wavelength values with units of nm, and the y-axis is the normalized transmission in dB scale. For example, with regard to the normalized transmission, 0 dB means 100% transmission and −20 dB means 1% transmission. The same values for the x-axis and y-axis values of FIG. 3 are also used in FIGS. 5A-5C, which are discussed in more detail below.

Figure 4:
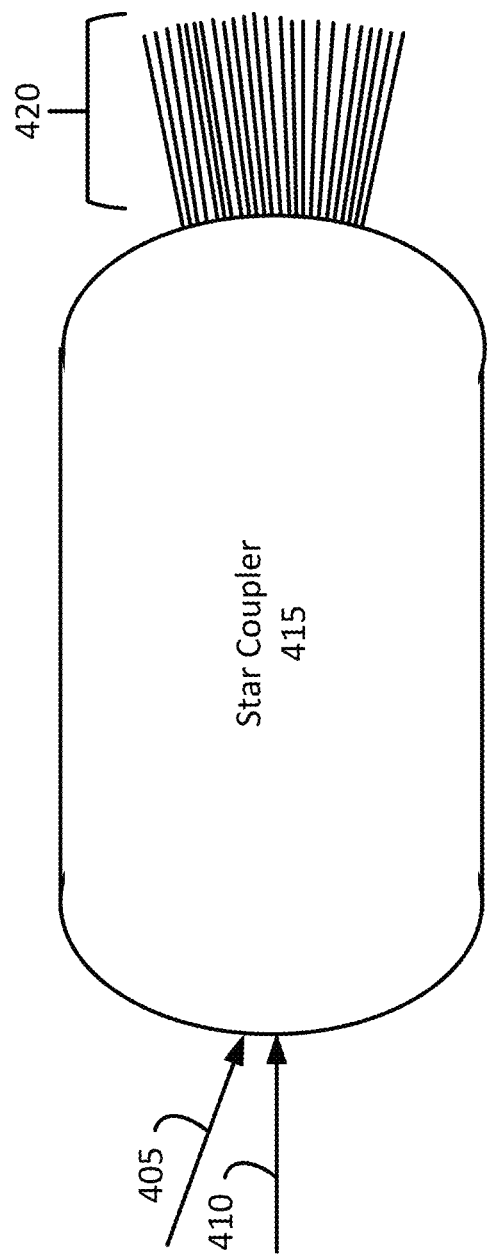
FIG. 4 illustrates a star coupler in accordance with an embodiment of the disclosure.

Refer now to the example embodiments of FIG. 4, which shows a star coupler, in accordance with an embodiment of the disclosure. As shown, star coupler 415 is operable to receive input signals via input waveguide 405 and input waveguide 410. Star coupler 415 is enabled to split each input signal into a plurality of output signals through arrayed waveguide (AWG) 420.

Figure 5A:
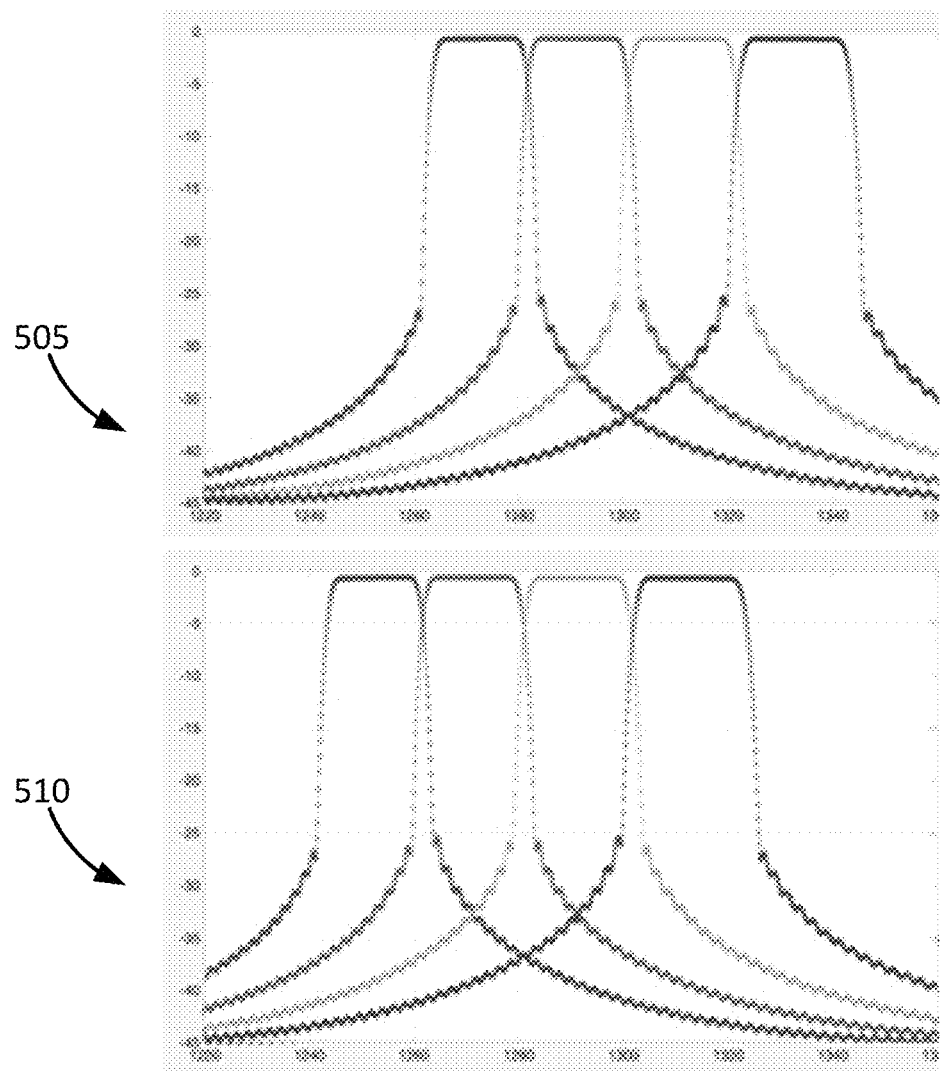
FIG. 5A-5C illustrates show exemplary transmission spectra of an arrayed waveguide grating demultiplexer in accordance with one or more aspects of the disclosure.
Figure 5B:
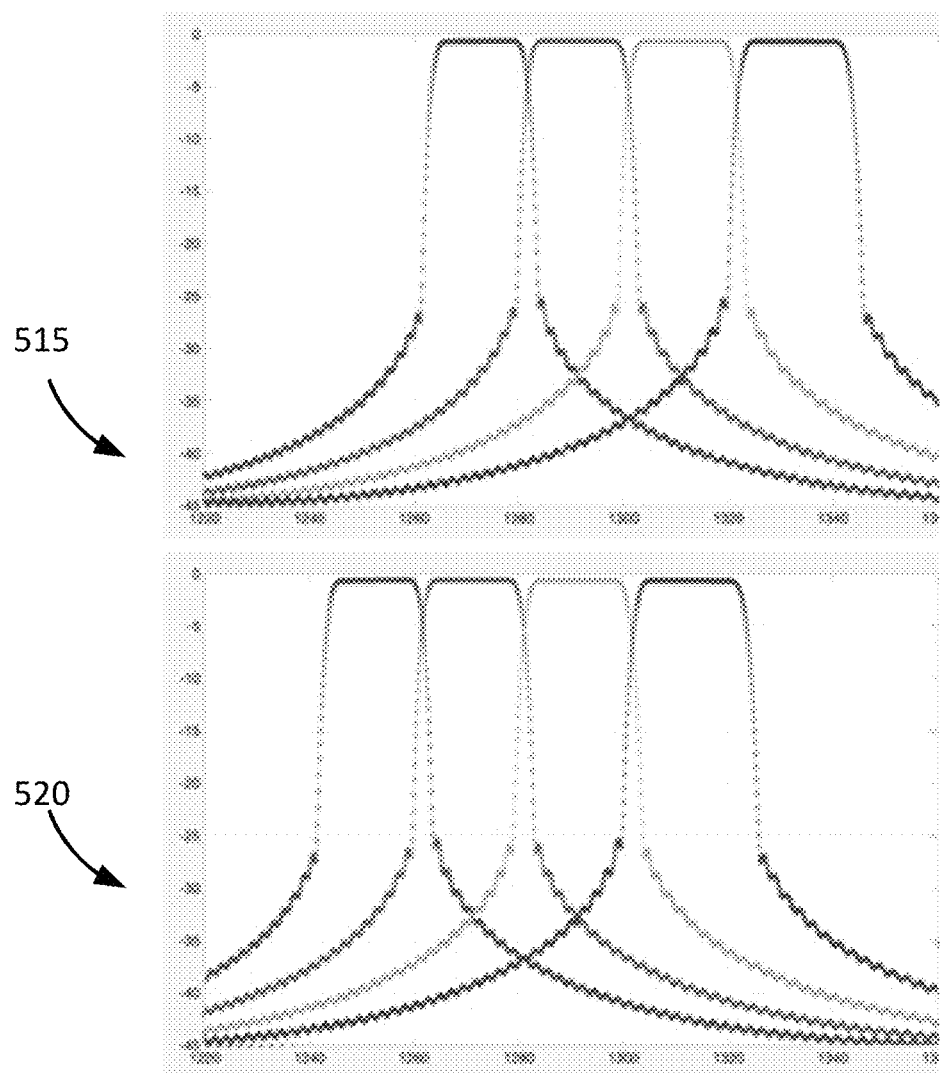
Figure 5C:
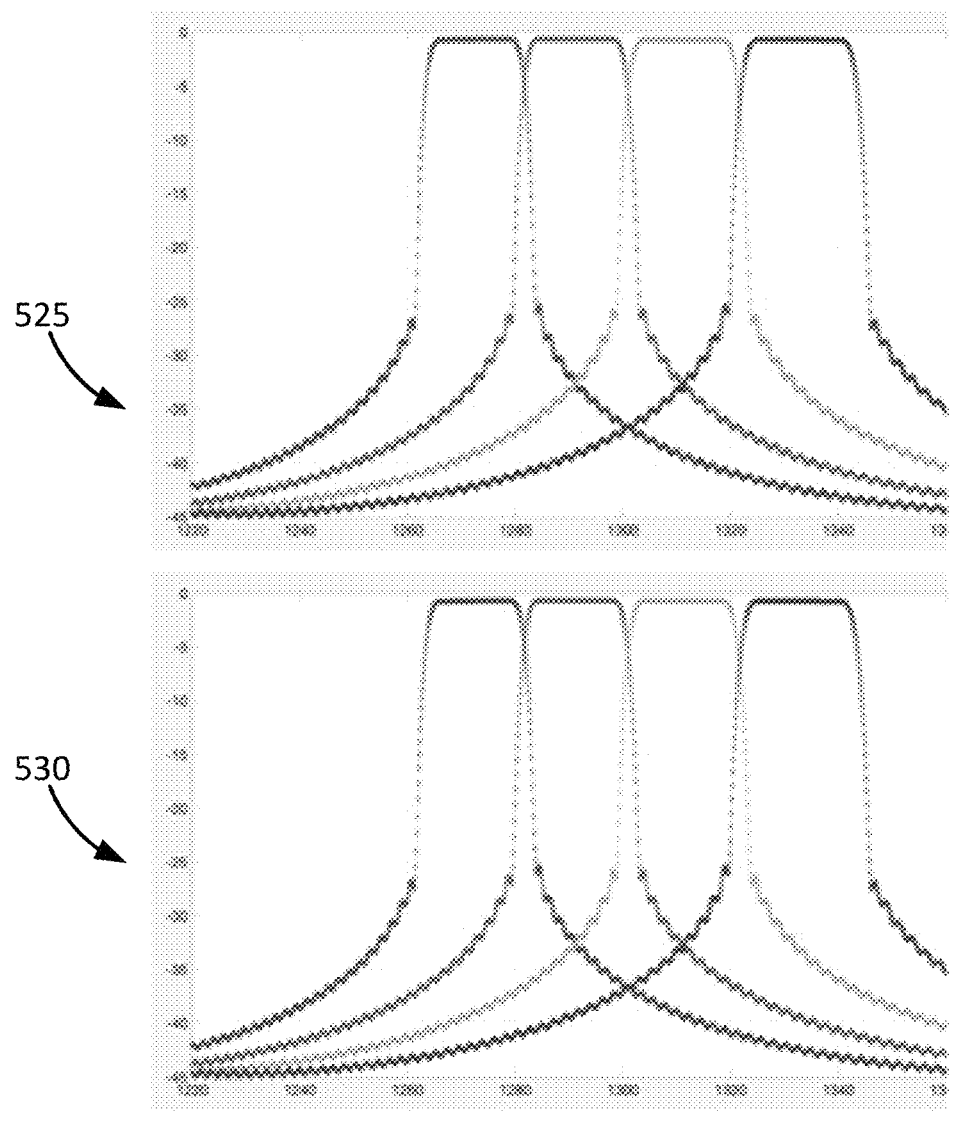

Refer now to the example embodiments of FIGS. 5A-5C, which show exemplary transmission spectra of an AWG demultiplexer as shown in FIG. 2, to illustrate how the polarization and input waveguide location affect the transmission spectrum. FIG. 5A shows transmission spectra for one input for example 215-A in FIG. 2, with graph 505 for one polarization X and graph 510 is for the other polarization Y. In comparison, the difference in polarization causes the output to be shifted (e.g., graph 505 when compared to graph 510).

FIG. 5B shows transmission spectra for the same polarization, but two different inputs for example 215-A and 215-B in FIG. 2. In this instance, graph 515 are input via waveguide 215-A and graph 520 are input via waveguide 215-B. In comparison, the difference in input waveguides causes the output to be shifted (e.g., graph 515 when compared to graph 520).

FIG. 5C shows exemplary transmission spectra of an AWG demultiplexer as shown in FIG. 2 with one input having a X polarization and another input having a Y polarization. In this instance, graph 525 is for X polarization via waveguide 215-A, and graph 530 is for Y polarization via waveguide 215-B. In comparison, when one polarization at one input waveguide, and another polarization at a second input waveguide are used, the transmission spectra can be aligned (e.g., graph 525 when compared to graph 530), therefore a single set of outputs are produced.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A system comprising:
a polarization beam splitter configured to output a first polarized signal and a second polarized signal based on an input signal; and
a wavelength demultiplexer (WDM) that is polarization diversified,
the WDM comprising
a first star coupler having a first input and a second input,
a second star coupler having a set of output waveguides, and
arrayed waveguide grating (AWG), wherein the AWG has a shape configured to align a first transmission spectra of the first polarized signal and a second transmission spectra of the second polarization signal from the polarization beam splitter such that the WDM output signals are directed to a single set of output waveguides,
wherein the WDM is configured to receive as two inputs, the first polarized signal and the second polarization signal from the polarization beam splitter, wherein the WDM is further configured to output signals to the single set of output waveguides,
wherein each output waveguide of the single set is configured to recombine signals from both the first polarized signal and the second polarized signal.

2. The system of claim 1, wherein the WDM is part of a photonic integrated circuit.

3. The system of claim 2, wherein the outputs of the WDM are integrated waveguides.

4. The system of claim 1, wherein the shape is configured to direct a plurality of signals output from the first star coupler to specific output locations at the second star coupler.

5. A system comprising:
an optical receiver, comprising:
a polarization beam splitter configured to output a first polarized signal having a first transmission spectra and a second polarized signal having a second transmission spectra based on an input signal; and
a wavelength demultiplexer (WDM) having two inputs, a first input and a second input, that are connected to the two outputs of the polarization beam splitter, and configured to align the first transmission spectra the second transmission spectra and output a single set of outputs that carry signals of both polarizations, based on the first polarized signal from the first input and the second polarized signal from the second input.

6. The system of claim 5, wherein the WDM is part of a photonic integrated circuit.

7. The system of claim 5, wherein the WDM is an arrayed waveguide grating.

8. The system of claim 5, wherein the WDM is an echelle grating.

9. The system of claim 6, wherein the outputs of the WDM are integrated waveguides.

10. A method of demultiplexing signals, the method comprising:
receiving an input signal;
splitting polarizations, via a polarization beam splitter, of the input signal into a first polarization signal having a first transmission spectra and a second polarization signal having a second transmission spectra;

coupling the first polarization signal to a wavelength demultiplexer via a first input and the second polarization signal to the same wavelength demultiplexer via a second input;

separating the wavelengths using a first star coupler of the wavelength demultiplexer;

aligning the first transmission spectra and the second transmission spectra, using a second star coupler of the wavelength demultiplexer; and outputting different signals to one set of outputs that carry signals of both polarizations from the second star coupler.

11. The method of claim 10, wherein the wavelength demultiplexer is an arrayed waveguide grating.

12. The method of claim 10, wherein the wavelength demultiplexer is an echelle grating.

13. The method of claim 10, wherein the wavelength demultiplexer comprises one or more integrated waveguides.

* * * * *